(12) United States Patent
Jeong et al.

(10) Patent No.: US 6,476,105 B2
(45) Date of Patent: Nov. 5, 2002

(54) POLYAMIDE RESIN COMPOSITION

(75) Inventors: Kie-Youn Jeong, Kyoungki-do (KR); Sang-Rok Lee, Kyoungki-do (KR); Hee-Won Seo, Ulsan (KR)

(73) Assignees: Hyundai Motor Company, Seoul (KR); Honeywell Korea Co., Ltd., Seoul (KR)

( * ) Notice: Subject to any disclaimer, the term of this patent is extended or adjusted under 35 U.S.C. 154(b) by 0 days.

(21) Appl. No.: 09/971,574

(22) Filed: Oct. 9, 2001

(65) Prior Publication Data

US 2002/0099117 A1 Jul. 25, 2002

(30) Foreign Application Priority Data

Nov. 30, 2000 (KR) .............................. 00-72015

(51) Int. Cl.$^7$ ............................ C08K 5/34; C08K 5/521
(52) U.S. Cl. ......................... 524/99; 524/100; 524/101; 524/102; 524/103; 524/104; 524/105; 524/106; 524/127
(58) Field of Search .......................... 524/99, 100, 101, 524/102, 103, 104, 105, 106, 127

(56) References Cited

U.S. PATENT DOCUMENTS

| | | | | |
|---|---|---|---|---|
| 4,639,479 A | * | 1/1987 | Lai et al. ................... 524/100 |
| 5,290,836 A | * | 3/1994 | Truyen ........................ 524/127 |
| 5,401,797 A | * | 3/1995 | Kotani et al. ................. 524/100 |
| 5,457,144 A | * | 10/1995 | Holy et al. ................... 524/108 |
| 5,605,962 A | * | 2/1997 | Suzuki et al. .................. 525/70 |
| 5,760,120 A | * | 6/1998 | Itoh et al. .................... 524/431 |
| 5,804,621 A | * | 9/1998 | Kimura et al. ................ 524/100 |
| 5,852,159 A | * | 12/1998 | Zäh et al. .................... 528/363 |
| 5,945,469 A | * | 8/1999 | Heath et al. ................. 524/100 |
| 5,948,836 A | * | 9/1999 | Bonora ........................ 524/100 |
| 5,965,641 A | * | 10/1999 | Gugumus ..................... 524/86 |
| 6,087,433 A | * | 7/2000 | Hanada et al. ............... 524/493 |
| 6,166,114 A | * | 12/2000 | Cosstick et al. ............. 524/100 |
| 6,335,767 B1 | * | 3/2002 | Takagi ........................ 528/198 |

FOREIGN PATENT DOCUMENTS

JP      182 874    *  7/1998

* cited by examiner

*Primary Examiner*—Peter Szekely
(74) *Attorney, Agent, or Firm*—Birch, Stewart, Kolasch & Birch, LLP

(57) ABSTRACT

The present invention relates to a polyamide resin composition having excellent weather resistance and coating adhesion property and more particularly, to the polyamide resin composition capable of direct painting without pretreatment of primer and maintaining excellent weather resistance for a long period of exposure outside by adding an appropriate amount of a weathering stabilizer and a coating adhesion improver.

4 Claims, No Drawings

POLYAMIDE RESIN COMPOSITION

BACKGROUND OF THE INVENTION

Field of the Invention

The present invention relates to a polyamide resin composition having excellent weather resistance and coating adhesion property and more particularly, to the polyamide resin composition capable of direct painting without pretreatment of primer and maintaining excellent weather resistance for a long period of exposure outside by adding an appropriate amount of a weathering stabilizer and a coating adhesion improver.

Polyamide resins have been widely used in automotive interior and exterior parts, electrical parts, sport goods, and industrial parts because of their excellent physical properties such as mechanical strength, heat resistance, chemical resistance, scratch resistance, insulating property, arc resistance and the like. However, the use of these polyamide resins requiring weather resistance for a long period of time has been restricted since when polyamide resins are exposed outside for a long period of time, color can be deteriorated and physical properties become inferior for photodecomposition.

There have been studied to eliminate such problems by adding antioxidant or weathering stabilizer to polyamide resins (U.S. Pat. Nos. 5,945,469, 5,851,238, and 5,814,107). However, there is a drawback associated with adding such antioxidant or weathering stabilizer in that mechanical properties are remarkably reduced.

As another method to improve weather resistance, surface is coated to maintain its physical properties. However, it requires pretreatment of the surface or primer such as flame treatment, ozone treatment, and plasma treatment since polyamide resins are non-polar polymers having poor adhesion property to paints. And further, this method requires additional devices for surface treatment and primer treatment, thus increase in cost and use of environmental hazard materials.

SUMMARY OF THE INVENTION

In an effort to solve these problems, the inventors of the present invention figured out that the polyamide resin composition can be capable of direct painting without pretreatment of primer and maintaining excellent weather resistance for a long period of exposure outside by adding an appropriate amount of a weathering stabilizer and a coating adhesion improver.

Therefore, an object of the present invention is to provide polyamide resin composition satisfying color for a long period of exposure and manufacturing cost and processability due to simplified preparing method.

DETAILED DESCRIPTION OF THE INVENTION

The present invention is characterized in that polyamide resin composition comprises:

(A) 30–99 parts by weight of polyamide resin;
(B) 1–65 parts by weight of a reinforcing filler;
(C) 0.1–5 parts by weight of a hindered amine based weathering stabilizer having 3000–4000 of molecular weight; and
(D) 0.1–5 parts by weight of a coating adhesion improver selected from the group consisting of phosphorous-containing anti-oxidant, phosphorous-containing anti-oxidant heat stabilizer, phosphorous-containing anti-oxidant anti-static agent and phosphorous-containing anti-oxidant flame retardant.

The present invention is described in detail as set forth hereunder.

(A) Polyamide Resin

The polyamide resin of the present invention is prepared by polycondensation of cyclolactam having higher than 3-membered ring, ω-amino acid, or a mixture thereof or polycondensation of at least one of dicarboxylic acids and at least one of diamines. Examples of monomers for polycondensation include ε-caprolactam, aminocapronic acid, enantholactam, 7-aminoheptanoic acid, 11-aminoundecanoic acid, 9-aminononanoic acid, and α-piperidone. Examples of diamines for polycondensation include tetramethylenediamine, hexamethylenediamine, nonamethylenediamine, decamethylenediamine, undecamethylenediamine, dodecamethylenediamine, p-aminoaniline, and m-xylenediamine. Examples of dicarboxylic acids include adipic acid, sebacic acid, dodecanedicarboxylic acid, glutaric acid, terephthalic acid, 2-methylterephthalic acid, isophthalic acid, and naphthalenedicarboxylic acid. Polyfunctional compounds can be added within less than 5 mol % in addition to dicarboxylic acids or diamines and examples are trimellitic acid and pyromellitic acid. Particular examples of the polyamide resin are nylon 6, nylon 7, nylon 8, nylon 11, nylon 12, nylon 2, nylon 66, nylon 69, nylon 610, nylon 611, nylon 612, nylon 6T, nylon 6/66, nylon 6/12, nylon 6/6T. These nylons can be blended at any desired ratio.

The polyamide resin may be prepared by any polymerization method such as anionic polymerization, mass polymerization, solution polymerization, melt polymerization using salts, interfacial polymerization. Any polymerization can be applied for polyamide copolymers polymerized by using two or three kinds of monomers.

Moreover, polyimide (PI), polysulfone (PSU), polyethersulfone (PES), polyphenylene sulfide (PPS), polyphenylene ether (PPE), high impact polystyrene (HIPS), acrylonitrile-butadiene-styrene copolymer (ABS copolymer), acrylonitrile-ethylenepropylene-styrene copolymer (AES copolymer), acrylonitrile-styrene-arylacrylate (ASA), arylmetacrylate-butadiene-styrene (MBS), styrene-butadiene-styrene triblock copolymer, maleic anhydride grafted SBS block copolymer (SBS-gMA), maleic anhydride grafted SEBS block copolymer (SEBS-g-MA), polycarbonate, polyethyleneterephthalate (PET), polybutyleneterephthalate (PBT), all-acrylic, core-shell rubber, ethylenevinylacetate rubber (EVA), ethyleneethylacrylate (EEA), polyolefin resin, EPR rubber (EPR), EPDM rubber (EPDR), styrene butadiene rubber (SBR), ethylene vinylalcohol (EVOH), thermoplastic elastomer, plastomer, or a mixture thereof can be blended or polymerized to reinforce molecular weight, heat resistance and impact strength. Polystyrene grafted with oxazolines, polyolefin grafted with maleic anhydrides or a compatibilizer can be added to improve properties of these blends. Polyamide resin may be alloyed with one selected from acrylonitrile-butadiene copolymer, polyolefin resin, polycarbonate, polyethylene terephthalate, polybutyene terephthalate, polysulfone, polyethersulfone, polyphenylene sulfide, polyphenylene ether, oxide, high impact strength polystyrene and a mixture thereof. The polyamide resin (A) should be added in the amount of 30–99 parts by weight, preferably 40–99 parts by weight. If the amount of polyamide resin (A) is less than 30 parts by weight, it looses its nylon properties. If it is more than 99 parts by weight, coating adhesion is inferior.

(B) Reinforcing Filler

The polyamide resin composition of the present invention contains a reinforcing filler to reinforce mechanical strength and heat resistance. Particular examples of the filler are glass fiber, glass beads, glass flakes, mica, talc, carbon fibers, kaolin, wollastonite, molybdenum disulfate, potassium titanate, barium sulfate, conductive carbon black, aramide fibers, whisker and a mixture thereof. The filler (B) should be added in the amount of 1–65 parts by weight, preferably 5–60 parts by weight. If the amount is less than 1 part by weight, the physical properties are deteriorated. If the amount is more than 65 parts by weight, appearance of the molded product and processability become deteriorated.

(C) Weathering Stabilizer

Especially, the polyamide resin of the present invention contains a weathering stabilizer at an appropriate amount to reinforce weather resistance for a long period of exposure outside. Examples of weathering stabilizer are hindered amine light stabilizer (HALS), radical hals, phosphorous or phenol based anti-oxidant (AOs), benzotiazoles, hydrobenzophenones or a mixture thereof. When hindered amines are used, its volatile component or dissociated component during extrusion process should be within 10%. It is prefer not to react with other components except the main polymer and more preferably to have 3000–4000 of molecular weight. The weathering stabilizer can be used in the range of from 0.1 to 5 parts by weight, preferably 0.1 to 1 parts by weight. If the amount is less than 0.1 parts by weight, it is insufficient as a stabilizer. If it is more than 5 parts by weight, it will be difficult to obtain the desired physical properties and processability.

(D) Coating Adhesion Improver

The polyamide resin composition of the present invention contains a phosphorus-containing coating adhesion improver to make it be possible for direct coating without any pretreatment. Examples are phosphorus-containing anti-oxidant, phosphorus-containing heat stabilizer, phosphorus-containing anti-static agent and phosphorus-containing flame retardant. Examples of phosphorus-containing coating adhesion improver are: anti-oxidants are distearylpentaerythritol disphosphite, organic phosphite, diphenylisodecyl phosphite, diphenylisooctyl phosphite, diisodecylphenyl phosphite, triphenyl phosphite and trisnonylphenyl phosphite; heat stabilizers are multi-organic phosphite, polymerized phosphite, and tetrapentaerythritol; anti-static agent is phosphate ester; and flame retardant are red phosphorus, triallyl monophosphate [tricresyl phosphate (TCP), triphenyl phosphate (TPP), diphenylcresyl phosphate], melamine phosphate, dimelamine orthophosphate, and resorcinol-bisphenyl phosphate (RDP). Preferred amount of said coating adhesion improver is in the range of 0.1 to 5 parts by weight, more preferred is 0.5 to 3 parts by weight. If the amount is less than 0.1 parts by weight, the coating adhesion becomes inferior. On the other hand, if it is more than 5 parts by weight, it will be difficult to obtain the desired physical properties and processability.

Other additives, used by one having ordinary skill in the art, such as an anti-additive, a stabilizer, a heat stabilizer, a flame retardant, and an anti-static agent may be arbitrarily incorporated in the range of 0.1–80 parts by weight relatively to the polyamide resin composition not to obstruct the above-mentioned object of the present invention.

The polyamide resin composition of the present invention is prepared by kneading in melt in any of single-screw extruder, twin-screw extruder, roll mill, kneader mixer and bambury mixer after premixing with super mixer and pelletizing thereof. The prepared polyamide resin composition is performed for injection molding after removing moisture and volatile components to measure its physical properties and degree of coating adhesion to paint.

Now, the invention is described in more detail with reference to the following Examples, to which, however, the invention is not restricted without departing from the spirit and scope thereof.

EXAMPLES 1–6

Nylon 6 (Honeywell) or nylon 66 (Monsanto), a reinforcing filler, a coating adhesion improver rasorcinol bis(phenyl phosphate) (RDP) (Daihatchi Chem. Corp.), EPR rubber (Exxon Corp.), maleic anhydride grafted EPDM rubber (EPDM-g-MA; Exxon Corp.), maleic anhydride grafted SEBS (SEBS-g-MA; Shell Oil Company) with the composition and contents as in Table 1, were mixed and dry-blended. After mixing the mixture with twin-screw extruder set at 250° C. for nylon 6 and 280° C. for nylon 66, it was palletized and dried sufficiently. Each obtained resin composition pellet was prepared to test specimen using an injection forming machine.

Comparative Examples 1–2

Polyamide resin compositions were prepared without adding coating adhesion improver in the same manner as Example 1.

Experimental Example: Test of Physical Properties

Physical properties of the polyamide resin composition prepared from Examples 1–6 and Comparative Examples 1–2 were tested by the following method. The result is shown in Tables 1 and 2.

[Test Method]

(1) Tensile strength (kg/cm$^2$) and Elongation (%): measured in accordance with ASTM D 638

(2) Modulus of bending elasticity (kg/cm$^2$) and Flexural strength (kg/cm$^2$): measured in accordance with ASTM D 790

(3) Izod impact strength (kg·cm/cm$^2$): measured in accordance with ASTM D 256

(4) Thermal deformation temperature (° C.): measured in accordance with ASTM D 648 (4.6 kg/cm$^2$)

(5) Melt index (MI, g/10 min): measured in accordance with ASTM D 1238 (250° C., 275° C., 2.16 kg)

(6) Appearance and coating adhesion: examined with DISC specimen

[Coating Adhesion Test Method]

(1) Appearance: examined under 300lx of luminance by the naked eyes at the implied distance of 300 mm in accordance with blistering, bubbles, mottles, unevenness, orange peel, crack and the like.

(2) Initial adhesion: examined in accordance with KS M 5918; 100 square lines are formed by lining horizontally and vertically with 1 mm interval. Cellophane tape was adhered thereon. When cellophane tape was stripped off in perpendicular direction of the specimen, the square lines not stripped off were counted.

(3) Initial gloss: measured in accordance with test method 3312 of KS M 5000 (60°).

(4) Moisture resistance: the specimen were placed under 50±2° C., 982% RH in saturated vapor for 240 hrs and then left under atmosphere for 1 hr to examine the appearance in accordance with (1) method.

(5) Heat resistance: the specimen were placed in thermostat kept at 110±2° C. for 168 hrs and then left under atmosphere for 1 hr to examine the appearance in accordance with (1) method.

(6) Alkali resistance: the specimen were placed in 0.1N NaOH solution at 55±2° C. for 6 hrs, taken out to blow air, and then left under atmosphere for 1 hr to examine the appearance in accordance with (1) method.

(7) Acid resistance: the specimen were placed in 0.1N $H_2SO_4$ solution at 55±2° C. for 6 hrs, taken out to blow air, and then left under atmosphere for 1 hr to examine the appearance in accordance with (1) method.

(8) Gasoline resistance: the surface was wiped 8 times with cotton wool socked with conventional high octane gasoline and then left under atmosphere for 1 hr to examine the appearance in accordance with (1) method.

(9) Weather resistance: the specimen were exposed by means of SUNSHINE WEATHER-O-METER (at 63±3° C., raining time 12 min for 60 min) for 1,200 hrs in accordance with JIS D 0205 and then examined the appearance in accordance with (1) method.

The appearance was examined by the naked eyes as in (1) method in accordance with the following criteria:

⊙: no whitening on the surface

○: slight whitening on the surface

Δ: some whitening on the surface

×: drastic whitening on the surface

TABLE 1

| Category | Examples | | | | | | Comp. Ex. | |
|---|---|---|---|---|---|---|---|---|
| | 1 | 2 | 3 | 4 | 5 | 6 | 1 | 2 |
| Polyamide resin | | | | | | | | |
| Nylon 66[1)] | 84.1 | 83.1 | 81.6 | — | — | — | 84.6 | — |
| Nylon 6[2)] | — | — | — | 70.6 | 69.6 | 68.1 | — | 71.4 |
| Coating adhesion improver | | | | | | | | |
| RDP[3)] | 0.5 | 1.5 | 3.0 | 0.5 | 1.5 | 3.0 | — | — |
| Weathering stabilizer | | | | | | | | |
| Hindered amine[4)] | 0.4 | 0.4 | 0.4 | 0.4 | 0.4 | 0.4 | 0.4 | 0.4 |
| EPR rubber[5)] | 7.5 | 7.5 | 7.5 | — | — | — | 7.5 | — |
| EPDM-g-MA[6)] | — | — | — | 5.5 | 5.5 | 5.5 | — | 5.5 |
| SEBS-g-MA[7)] | 7.5 | 7.5 | 7.5 | — | — | — | 7.5 | — |
| Reinforcing filler[6)] | — | — | — | 23.0 | 23.0 | 23.0 | — | 23.0 |
| Properties | | | | | | | | |
| Tensile strength (kg/cm$^2$) | 597 | 590 | 585 | 600 | 590 | 580 | 603 | 608 |
| Elongation (%) | 40 | 45 | 45 | 6.5 | 8.5 | 10.2 | 40 | 6.5 |
| Flexural strength (kg/cm$^2$) | 770 | 780 | 770 | 900 | 880 | 860 | 790 | 930 |
| Modulus of bending elasticity (kg/cm$^2$) | 20,000 | 19,900 | 19,800 | 34,000 | 33,800 | 33,400 | 20,300 | 34,300 |
| Impact strength (kg.cm/cm$^2$) | 81 | 82 | 83 | 3.9 | 4.0 | 4.0 | 80 | 3.8 |
| Thermal deformation temperature (° C.) | 205 | 206 | 204 | 182 | 181 | 181 | 207 | 182 |
| Melt index (g/10 min) | 5.5 | 5.3 | 5.6 | 12.0 | 12.3 | 12.2 | 5.5 | 12.5 |

As described above, the polyamide resin composition of the present invention contains a weathering stabilizer and a coating adhesion improver in the desired amount to reinforce light resistance, perform direct coating without any pretreatment, and reduce manufacturing cost due to reduced coating process.

What is claimed is:

1. A polyamide resin composition comprising:

(A) 30–99 parts by weight of polyamide resin;

(B) 1–65 parts by weight of a reinforcing filler;

(C) 0.1–5 parts by weight of a hindered amine having 3000–4000 of molecular weight as a weathering stabilizer; and (D) 0.1–5 parts by weight of resorcinolbisphenyl phosphate as a coating adhesion improver.

2. The polyamide resin composition according to claim 1, wherein said polyamide resin is prepared by polymerization of lactam having higher than 3-membered ring, ω-aminoic acid or a mixture thereof, or by polymerization of at least one of dicarboxylic acids and at least one of diamines.

3. The polyamide resin composition according to claim 1, wherein said polyamide resin is an alloyed resin with at least one selected from the group consisting of acrylonitrile-butadiene copolymer, polyolefin resin, polycarbonate, polyethyleneterephthalate, polybutyleneterephthalate, polysulfone, polyethersulfone, polyphenylene sulfide, polyphenylene ether, oxide and high impact polystyrene.

4. The polyamide resin composition according to claim 1, wherein said filler is selected from the group consisting of glass fiber, glass beads, glass flake, mica, talc, carbon fibers, kaolin, wollastonite, molybdenum disulfate, potassium titanate, barium sulfate, conductive carbon black, aramide fibers, and a mixture thereof.

* * * * *